US005678165A

United States Patent [19]

Wu

[11] Patent Number: 5,678,165
[45] Date of Patent: Oct. 14, 1997

[54] PLASTIC FORMABLE MIXTURES AND METHOD OF USE THEREFOR

[75] Inventor: Shy-Hsien Wu, Horseheads, N.Y.

[73] Assignee: Corning Incorporated, Corning, N.Y.

[21] Appl. No.: 569,327

[22] Filed: Dec. 6, 1995

[51] Int. Cl.$^6$ .......................................... B22F 1/00
[52] U.S. Cl. ................... 419/37; 419/36; 419/54; 419/41; 75/255; 75/252; 106/640; 106/638; 264/413
[58] Field of Search ................... 419/37, 36, 54, 419/41; 75/255, 252; 106/640, 638; 264/413

[56] References Cited

U.S. PATENT DOCUMENTS

| | | |
|---|---|---|
| 3,885,977 | 5/1975 | Lachman et al. |
| 4,417,908 | 11/1983 | Pitcher. |
| 4,758,272 | 7/1988 | Pierotti et al. |
| 4,772,580 | 9/1988 | Hamanaka et al. |
| 4,992,233 | 2/1991 | Swaroop et al. |
| 5,114,643 | 5/1992 | Beall et al. |
| 5,114,644 | 5/1992 | Beall et al. |
| 5,344,799 | 9/1994 | Wu. |
| 5,429,792 | 7/1995 | Luk. |

FOREIGN PATENT DOCUMENTS 0 488 716 A1  3/1992  European Pat. Off.

OTHER PUBLICATIONS

Publication 8084A, "Coatings Performance Materials", by Monsanto, 1991, pp. 4, 15, and 34.
Bulletin E–42329, "Surlyn® Ionomer Resin" by Dupont.

*Primary Examiner*—Charles T. Jordan
*Assistant Examiner*—Anthony Chi
*Attorney, Agent, or Firm*—L. Rita Quatrini

[57] ABSTRACT

A plastically deformable aqueous mixture capable of being shaped into a body, the mixture being composed of any one or combination of ceramic, glass-ceramic, glass, molecular sieve, carbon, or metal powders, cellulose ether organic binder, water insoluble hydrophobic polymer co-binder having an average molecular weight of at least about 8,000, plasticizer, and water. A method of making a body which involves mixing the above components in a high shear mixer at a temperature of about 30° C. to 70° C. to form a homogeneous mixture, extruding the mixture at a temperature of about 30° C. to 70° C. into a green body, followed by drying and firing to produce the product body.

31 Claims, No Drawings

PLASTIC FORMABLE MIXTURES AND METHOD OF USE THEREFOR

This invention relates to improved plastically formable water-based mixtures of powders, e.g. ceramic powders which contain cellulose ether binders along with certain water-insoluble hydrophobic polymers, and plasticizers, and optionally wax. The mixtures have good formability properties. They can be formed into bodies, even very complex bodies e.g. by being drawn into high cell density honeycombs, or fibers having superior toughness, cohesive, and water repellent properties.

BACKGROUND OF THE INVENTION

Plastic formable powder mixtures, e.g. ceramic powder mixtures having a cellulose ether type plasticizing organic binder are shaped into bodies which have many uses such as substrates, e.g. honeycombs, for catalysts, etc. The mixtures must be well blended and homogeneous in order for the resulting shaped body to have good integrity in size and shape, and uniform physical properties. The mixtures have organic additives such as binders, plasticizers, surfactants, lubricants, dispersants as processing aids to enhance wetting and therefore produce a uniform batch. In forming processes, such as in extrusion, high pressures must be exerted on both the plasticized batch material and the equipment, e.g. an extrusion die.

Up to the present time, hydrophilic additives such as sodium stearate, glycerine, and glycols have been used to ensure good batch lubrication against the die and other equipment parts thus ensuring a long life, good extruded product quality, and low extrusion pressure.

Several of the many U.S. patents that relate to forming cordierite honeycombs by forming batch mixtures of cordierite raw materials are U.S. Pat. Nos. 4,772,580, 3,885,977, 4,417,908, 5,114,643, and 5,114,644.

More recently U.S. Pat. No. 5,344,799 relates to plastic formable mixtures having hydrophobic and hydrophilic additives to enhance the wetting and lubrication properties of the mixtures.

However, there remains an ongoing need to improve such plastic formable powder mixtures to produce tougher, more cohesive, and water-repellent bodies, especially in the case of more complex bodies such as very high cell density honeycombs, or in producing fibers.

SUMMARY OF THE INVENTION

In accordance with one aspect of the invention, there is provided a plastically deformable aqueous mixture capable of being shaped into a body, the mixture being composed of any one or combination of ceramic, glass-ceramic, glass, molecular sieve, carbon, or metal powders, cellulose ether organic binder, water insoluble hydrophobic polymer co-binder having an average molecular weight of at least about 8,000, plasticizer, and water.

In accordance with another aspect of the invention, there is provided a method of making a body which involves mixing the above components in a high shear mixer at a temperature of about 30° C. to 70° C. to form a homogeneous mixture, extruding the mixture at a temperature of about 30° C. to 70° C. into a green body, followed by drying and firing to produce the product body.

DETAILED DESCRIPTION OF THE INVENTION

This invention relates to improved aqueous or water-based mixtures of powders, which contain cellulose ether binders along with certain water-insoluble polymers, plasticizers, and optionally wax. The mixture components including the polymer, plasticizer, and wax, can be mixed directly in a water-based mixture as opposed to pre-melting or emulsifying selected components. This is an advantage in itself, because it simplifies the batching process. The mixtures are unique in that hydrophobic polymers can be used in an aqueous mixture to form green bodies. The mixtures can be formed into even very complex bodies or fibers having superior toughness, cohesive, and water repellent properties. According to this invention, the term "body" denotes both monolithic bodies and fibers.

In general, The powders can be ceramic, glass-ceramic, glass, molecular sieve, carbon, metal, and combinations thereof. Especially suited are oxide powders such as ceramic, glass, glass-ceramic, and molecular sieve, e.g. zeolite. According to this invention the term "powder" denotes the inorganic solid components.

Ceramic, glass ceramic and glass powders

It is to be understood that any powders included under the above class or which when fired yield materials in the above described class can be used. By combinations is meant physical or chemical combinations, e.g., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, e.g., silicon carbide, silicon nitride or mixtures of these.

Especially suited are ceramic materials, such as those that yield cordierite, mullite, or mixtures of these on firing, some examples of such mixtures being, for example, about 55% to about 60% mullite, and about 30% to about 45% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The powders can be synthetically produced materials such as oxides, hydroxides, etc, or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, having a particle size of about 7–9 micrometers, and a surface area of about 5–7 $m^2/g$, such as Hydrite MP™, those having a particle size of about 2–5 micrometers, and a surface area of about 10–14 $m^2/g$, such as Hydrite PX™, delaminated kaolinite having a particle size of about 1–3 micrometers, and a surface area of about 13–17 $m^2/g$, such as KAOPAQUE-10™, calcined clay, having a particle size of about 1–3 micrometers, and a surface area of about 6–8 $m^2/g$, such as Glomax LL. All of the above named materials are sold by Dry Branch Kaolin, Dry Branch, Ga.

Some typical kinds of talc are those having a particle size of about 6–8 micrometers, and a surface area of about 5–8 $m^2/g$, such as Pfizer talc 95-27, and 95-28.

Some typical aluminas are coarse aluminas, for example, Alcan C-700 series, such as those having a particle size of about 4–6 micrometers, and a surface area of about 0.5–1 $m^2/g$, e.g., C-701™, fine alumina having a particle size of about 0.5–2 micrometers, and a surface area of about 8–11 $m^2/g$, such as A-16SG from Alcoa.

One typical kind of silica is that having a particle size of about 9–11 micrometers, and a surface area of about 4–6 $m^2/g$, such as IMSIL™ sold by Unimin Corporation.

In general, the powder material is fine powder (in contrast to coarse grained materials) some components of which can either impart plasticity, such as clays, when mixed with a vehicle such as water, or which when combined with organic materials such as for example the organic binder can contribute to plasticity.

Molecular sieve powders

Some types of molecular sieves which are preferred for the practice of the present invention are carbon molecular sieves, zeolites which are especially suited and are preferred, aluminophosphates, metallophosphates, silicoaluminophosphates, and combinations of these. Some preferred zeolites are faujasite type, e.g. Y zeolite, pentasil e.g. ZSM type such as ZSM-5, mordenite, and beta, and combinations of these.

Carbon powders

By carbon powders is generally meant activated carbon. Any available activated carbon can be used.

One source of activated carbon type (1) suitable for use in this invention is BPL F3 activated carbon available from Calgon Corp. in several particle sizes and at different measurements of surface area. A particular preferred variety of activated carbon from this source is the "6×16" mesh size, which is available at a surface area of about 1050 to about 1300 $m^2/g$.

Another especially suited combination of activated carbon powders is 80% Calgon Carbon BPL-F3® and about 20% Nuchar® SN-20 which is a coarse powder available from Westvaco, having an average particle size of about 20–50 and usually about 30 micrometers in diameter and a surface area as measured by $N_2$ BET method of about 1300–1350 $m^2/g$.

Metal powders

The invention is suitable for use with metal powders. Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders are disclosed in U.S. Pat. Nos. 4,992,233, 4,758,272, and European patent application publication no. 488716A1, which are herein incorporated by reference as filed.

The organic Binder

The organic binder imparts plasticity to the mixture. Organic binder according to the present invention refers to thermally gellable binders: cellulose ether type binders and/or their derivatives, most typically methylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Advantageously methylcellulose and/or methylcellulose derivatives are used in the practice of the present invention. Methylcellulose, hydroxypropyl methylcellulose, and combinations thereof are especially preferred. Preferred sources of cellulose ethers and/or derivatives thereof, are Methocel® A4M, F40M, and K75M from Dow Chemical Co. Methocel® A4M is a methylcellulose binder having a gel temperature of 50°–55° C., and a gel strength of 5000 $g/cm^2$ (based on a 2% solution at 65° C.). Methocel® F40M and K75M are hydroxypropyl methylcellulose.

The polymer co-binder

The polymer co-binder is a water insoluble, hydrophobic material of high molecular weight, i.e. an average molecular weight of at least about 8,000. Some polymers that can be used are polyvinyl butyral, ionomers, polyurethane, polyester, polyamide, acrylics, copolyethylene/acrylic acid, thermoplastic elastomers, and combinations of these. Especially suited are polyvinyl butyral, ionomers, polyurethane, polyester, thermoplastic elastomers, and combinations of these. These latter listed polymers are especially useful in forming high cell density honeycombs and fibers which are made by drawing extruded honeycombs and noodles respectively.

Ionomers are ionically cross-linked thermoplastic polymers. One suited ionomer is supplied by DuPont under the name fo SURLYN®. SURLYN ionomer resins are derived from ethylene/methacrylic acid copolymers and is available either as a sodium or a zinc ionomer. Information on SURLYN® ionomers is given in bulletin E-42329 "SURLYN® IONOMER RESIN", by DuPont.

Especially advantageous is polyvinyl butyral (PVB). This is a tough water-insoluble polymer that can be added directly to an aqueous mixture under high temperature and shear to impart toughness, stretchability, and heat-sealability to mixtures, e.g. ceramic mixtures. (Heat sealability is determined by pressing two heated extruded pieces together and observing for bonding.) Such properties allow extruded green bodies to be drawn into high cell density honeycombs or fibers. An especially preferred source of PVB is the Butvar® resins supplied by Monsanto among which those designated as B72, B-74, B-73, B-76, B-79, B-90, and B-98 are the most useful. The properties of these materials are listed on Monsanto Publication No. 8084A, "Coatings Performance Materials", page 4, Table 1 which Table is herein incorporated by reference. According to this publication Butvar® resins are white free-flowing powders having an average molecular weight of about 40,000 to 250,000, a hydroxyl content expressed as % polyvinyl alcohol of about 11.0–20.0, an acetate content expressed as polyvinyl acetate of 0 to about 2.5%, and a butyral content expressed as % polyvinyl butyral of about 80–88%.

Plasticizers

In general, the plasticizer can be any material that functions to improve flexibility over a broad temperature range. When polyvinyl butyral, ionomers, polyurethane, thermoplastic elastomers are used, low molecular weight polyester, i.e. having an average molecular weight of less than about 8,000, linseed oil, and ricinoleate types are especially suited as plasticizers. Some useful forms of polyester are Paraplex™ RGA-8 and G-25 supplied by C.P. Hall Co. Some useful forms of linseed oil are supplied by Arista Chemical Inc. and Reichold Chemicals Inc. A useful source of butyl ricinoleate is designated as Flexricin™ which is supplied by CasChem Inc. These and other plasticizers are described in Monsanto Publication No. 8084A, Table 5, page 15, and page 34 which pages are herein incorporated by reference.

An especially suitable polymer and plasticizer combination for the purposes of this invention is polyvinyl butyral and butyl ricinoleate.

Waxes

The function of the wax is to enhance hydrophobicity of the organic binder macromolecules to facilitate their accommodation of any hydrophobic material such as the hydrophobic polymer.

The waxes can be both natural and synthetic. Some natural waxes that can be used are paraffin, microcrystalline, mineral, vegetable such as carnauba, or animal waxes such as beeswax for example. Synthetic waxes include fatty alcohols such as hexadecanol, and octadecanol, fatty acids, such as stearic acid, palmitic acid, myristic acid, fatty acid esters, such as mono or di ethylene or propylene glycol mono or di stearates, polyethylene glycol stearates, glycerides such as glyceryl mono, di, or tri stearates, polyethylene wax, such as e.g. POLYWAX® by Petrolite, polyethylene glycol having an average molecular weight of up to about 20,000, such as e.g., Carbowax®, hydrogenated oils, ketones, amines, amides, chlorinated waxes, synthetic hydrocarbon wax, metallic soap e.g. zinc stearate, and mixtures of these. Especially suited are fatty alcohols such as hexadecanol, octadecanol, fatty acids such as stearic acid, palmitic and myristic acids, fatty acid esters such as ethylene or propylene glycol monostearates, paraffin wax, microcrystalline wax, polyethylene wax, and mixtures of these. It is advantageous to use wax, especially hexadecanol, with polyvinyl butyral and butyl ricinoleate.

A hydrophobic wax was found to be compatible with powder mixtures containing cellulose ether and/or derivatives and can be added directly, (i.e. all components mixed at once) to these components at an elevated temperature to impart a strong rapid-setting feature to a body produced from the mixture according to this invention.

The vehicle is water. The water content can vary depending on the type of materials to impart optimum handling properties and compatibility with other components in the mixture. From a practical standpoint, the water content is usually about 25% to 30% or it can be higher. Furthermore, if water evaporation loss is significant during mixing and extrusion some make-up water has to be added.

The weight percents of the organic binder, polymer, plasticizer, wax, and water are calculated as superadditions with respect to the non-organic solids by the following formula:

$$\frac{\text{weight of binder, wax or water}}{\text{weight units of non-organic solids}} \times 100.$$

One especially useful composition is cordierite and/or mullite powders, and in weight percent based on the powders: about 2% to 10% organic binder which can be methylcellulose and/or methylcellulose derivatives, about 5% to 50% polyvinyl butyral, about 2% to 50% butyl ricinoleate, and about 5% to 60% wax, preferably hexadecanol, and water.

Another useful composition is cordierite and/or mullite powders, and in weight percent based on the powders: about 3% to 6% organic binder which can be methylcellulose and/or methylcellulose derivatives, about 5% to 20% polyvinyl butyral, about 3% to 20% butyl ricinoleate, and about 5% to 40% wax, preferably hexadecanol, and water.

One especially useful composition that can be extruded into a honeycomb and then drawn into a higher cell density honeycomb is cordierite and/or mullite powders, and in weight percent based on the powders: about 3% to 6% organic binder which can be methylcellulose and/or methylcellulose derivatives, about 15% to 20% polyvinyl butyral, about 10% to 13% butyl ricinoleate, and about 10% to 20% wax, preferably hexadecanol, and water.

One especially useful composition that can be extruded into noodles and then drawn into fibers is cordierite and/or mullite powders, and in weight percent based on the powders: about 3% to 6% organic binder which can be methylcellulose and/or methylcellulose derivatives, about 15% to 20% polyvinyl butyral, about 15% to 20% butyl ricinoleate, and about 5% to 15% wax, preferably hexadecanol, and water.

One advantage of this invention is that all the mixture components including the water regardless of what they are, can be blended simultaneously under high shear as opposed to premelting or emulsifying selected components. One preferred method of making the mixture is to mix all the components together in a high shear mixer such as a Brabender, and mix for a sufficient time to completely plasticize the batch at room temperature or elevated temperature, e.g. about 30° C. to 70° C. , more typically about 50° C. to 70° C. , and most typically around 60° C.

Once the mixture is observed to be well plasticized, as indicated by torque rheometer and/or microscopic examination for any inhomogeneity, it is extruded at about 30° C. to 70° C. , more typically about 50° C. to 70° C. , and most typically around 60° C. into a green body.

A continuous auger or twin screw extruder is typically used, although any extrusion equipment known in the art can be used. A ram extruder can be used if modified to operate at the required extrusion temperatures.

If desired, the formed body can be cut into parts of varying sizes.

The bodies according to the present invention can have any convenient size and shape. For example, for hydrocarbon adsorption in engine exhaust purification, the preferred shape is a multicellular body such as a honeycomb structure.

Some examples of honeycombs produced by the process of the present invention, although it is to be understood that the invention is not limited to these, are those having $\geq 157$ cells/cm$^2$ ($\geq 1000$ cells/in$^2$), about 94 cells/cm$^2$ (about 600 cells/in$^2$), about 62 cells/cm$^2$ (about 400 cells/in$^2$), or about 47 cells/cm$^2$ (about 300 cells/in$^2$), about 31 cells/cm$^2$ (about 200 cells/in$^2$), about 15 cells/cm$^2$ (about 100 cells/in$^2$) or about 1.4 cells/cm$^2$ (9 cells/in$^2$). Web thicknesses range typically from about 4 to about 35 mils (about 0.1 to about 0.9 mm). Typical wall (web) thicknesses in catalytic converter applications, for example, are about 6 mils (about 0.15 mm) for 400 cells/in$^2$ (62 cells/cm$^2$) honeycombs. The external size and shape of the body is controlled by the application.

In forming honeycomb structures, it is preferred to extrude the mixture through a honeycomb die.

The honeycomb can be drawn to form a honeycomb having a greater cell density to eliminate difficulties of making a complex and expensive die. For example, a honeycomb having about 47 cells/cm$^2$ (about 300 cells/in$^2$) can be drawn into a honeycomb having >157 cells/cm$^2$ (>1000 cells/in$^2$) or about 188 cells/cm$^2$ (about 1200 cells/in$^2$).

The mixture can be formed into fibers. This is done by extruding the mixture through a noodling die to form noodles. The noodles are then drawn into fibers by drawing techniques well-known in the industry or as described in the examples that follow. For example, fibers can be make by extruding noodles of, for example, about 1 to 5 millimeters in diameter, and then drawing the noodles into fibers of, for example about 20 to 80 micrometers in diameter. Especially useful is to extrude noodles of about 3 millimeters in diameter and then redraw the noodles into fibers of about 50 micrometers in diameter.

The compositions as previously described are advantageous for the drawing operations.

The resulting formed body is then dried.

The best drying procedure for ceramics, glass ceramic, glass or molecular sieve is a combination of a short dielectric drying (<4 minutes) followed by oven drying at about 100° C. overnight (10–12 hr) to obtain a blister-free and distortion-free dried product.

For carbon or activated carbon bodies, the drying step involves a humidity control procedure which can be preceded by microwave drying to remove a portion of the vehicle.

Generally the humidity control procedure involves heating the body from about 35° C. to about 95° C. while the relative humidity is maintained at about 90–95% over a period of about 2 to 14 hours, and thereafter lowering the temperature and relative humidity gradually over a length of time to accomplish the drying.

Typically the relative humidity control procedure is carried out according to the following schedule.

| Step | T° (C.) | RH (%) | t (hrs.) |
|------|---------|--------|----------|
| 1    | 35–90   | 90–95  | 1–7      |
| 2    | 88–95   | 90–95  | 1–7      |

After steps 1 and 2, it is preferred to carry out the following additional steps:

| | | | |
|---|---|---|---|
| 3 | 90–95 | 90–80 | 2–6 |
| 4 | 90–95 | 80–70 | 2–6 |
| 5 | 90–60 | 70–60 | 2–6 |
| 6 | 60–30 | 60    | 2–6 |

For carbon bodies, the green body can be preferably pre-dried under microwave radiation for a length of time immediately prior to arcing. The length of time can be determined experimentally and will depend on sample size and on the particular oven.

For metal bodies, induction drying followed by oven drying (100° C. overnight) is used.

The dried body is then heated or fired to form the final product body. The firing conditions of temperature and time depend on the composition and size and geometry of the body, and the invention is not limited to specific firing temperatures and times. For example, in compositions which are primarily for forming cordierite, the temperatures are typically from about 1300° C. to about 1450° C., and the firing times are from about 1 hour to about 6 hours. For mixtures that are primarily for forming mullite, the temperatures are from about 1400° C. to about 1600° C., and the firing times are from about 1 hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours. For metal bodies, the temperatures are about 1000° C. to 1400° C. in a reducing atmosphere preferably hydrogen. Firing times depend on factors as discussed above but are typically at least 2 hours and typically about 4 hours. For carbon bodies, the temperatures are about 1000° C. to 1300° C. in a non-reacting atmosphere e.g nitrogen. Firing times depend on factors as discussed above but are typically about 1 to 8 hours. For zeolite bodies, the temperatures are about 400° C. to 1000° C. in air. Firing times depend on factors as discussed above but are typically about 4 hours.

To more fully illustrate the invention, the following non-limiting examples are presented. All parts, portions, and percentages are on a weight basis unless otherwise stated.

The following general procedure was followed in all of the examples with only the amounts of polymer and plasticizer being varied.

A typical mixture totaling about 407 g was made up of about 220 g of inorganic oxide powders which when fired form cordierite: Talc 95–28, about 40.2%, Glomax LL 21.2%, Hydrite MP 25.2%, and Alcan c-701 13.5%, about 6.6 g of Methocel K 75M (about 3%), about 44 g hexadecanol wax, (about 20%), about 44 g of Butvar B 79 (20%), about 22 g Flexricin P-3 (10%), and about 70.4 g of water (about 32%). Butvar crumbs were presoaked with the plasticizer P-3 for about 5 minutes with a constant hand stirring) before being added to the above dry blend for further mixing with a spatula in a stainless steel beaker. Finally, water was added to the mixture followed with more mixing to ensure obtaining a uniform powdery batch.

The batch was fed into a Brabender: (preset at about 60° C. ) and mixed for about 5.5 minutes after the peak torque at a temperature of about 60° C. to completely mix the wax and polymer uniformly. Flattened batch pieces were collected for checking wax traces under a microscope.

The mixture was extruded twice in a spaghetti form in a heated ram (set at about 60° C. ), then remained in the ram for about 15 minutes to equilibrate its temperature before the final extrusion to form a 15 cells/cm$^2$ (200 cells/in$^2$)/0.4 mm (16 mil) wall (web) and skin product. The sample was checked for ware quality (skin and cell knitting) and dried in a conventional oven at about 100° C. or a dielectric oven.

Obtaining a uniform PVB-containing aqueous mixture with methylcellulose organic binder Example 1

(Control without plasticizer or wax)

About 403 g of a mixture of about 20% Butvar B-79 and about 3% K-75M Methocel and about 250 g of powder oxides as described above and about 38% water were mixed in a Brabender at about 60° C. for over about 3 min. and extruded at about 60° C. The quality of a 15 cells/cm$^2$ (200 cells/in$^2$)/0.4 mm (16 mil) wall (web) and skin product was poor and the skin was torn. Many PVB chips were visible under a microscope. The honeycomb showed a significant rapid set feature. (The honeycomb was squeezed between the fingers along a 90° or 45° angle with respect to the cell direction. If rapid-setting, the honeycomb will hold its shape. If not rapid-setting, it will collapse.)

EXAMPLE 2

(Control without plasticizer or wax)

The procedure of Example 1 was followed except that Butvar B-98 was used and the batch was mixed for over about 5 minutes (B-98 has a molecular weight of about 40–70K as compared to 50–80K for B-79). The resulting skin quality was even worse than that of Example 1. PVB chips were detected also in the honeycomb.

In short, tough PVB crumbs could not be mixed uniformly in a ceramic batch at about 60° C.

EXAMPLE 3

(addition of plasticizer)

About 393 g of a mixture of about 20% Butvar B-79 and about 3% K-75M Methocel and about 230 g of powder oxides as described above, and about 10% plasticizer, Flexricin P-3, (or about 33.3% P-3 in a PVB/P-3 mixture), the plasticizer being added just prior to a 38% water addition was mixed at about 60° C. for over about 9 minutes. The resulting honeycomb quality was better than that of Example 1 with small holes on the skin and no torn section. The PVB chip size under the microscope was much smaller than in Example 1. Evidently, the addition of a plasticizer can soften tough PVB crumbs to some degree.

EXAMPLE 4

(addition of plasticizer)

The procedure of Example 3 was followed except that the order of addition of the plasticizer was changed to presoak the PVB crumbs with P-3 first (for about 10 minutes), and then add the damp PVB/P-3 mass to the dry powders followed by the final water addition. The batch was mixed at about 60° C. for over about 5 minutes. The ware quality was still imperfect, but the PVB chip size and number were further reduced from in Example 3. Presoaking brought further improvement.

EXAMPLE 5

(addition of plasticizer)

The procedure of Example 4 was followed except that the amount of plasticizer was increased to about 20% (or about 50% P-3 in a PVB/P-3 system), and the PVB crumbs were presoaked for about 6 minutes, and the 398 g batch (227 g of oxide powders and K 75M Methocel, 44 g B-79, 44 g P-3, and 84 g water) was mixed at about 60° C. for over about 4 minutes. The resulting honeycomb quality was very good. Under the microscope, no PVB chips were found in the batch pieces, suggesting a uniform mixing of PVB resin in the mixture. These results indicate that a hydrophobic polymer such as PVB can be mixed directly and uniformly in a water-based powder mixture containing a methylcellulose and/or methylcellulose derivative binder, especially by presoaking PVB with a sufficient amount of plasticizer (e.g. 1/1 PVB/P-3) and a high shear mixing at elevated temperatures such as about 60° C. The unique bifunctional nature of the organic binder macromolecules is responsible for obtaining such an unusual result. The resulting honeycomb displayed a strong tough and water-repellent nature due to the presence of a hydrophobic polymer PVB.

EXAMPLE 6

(addition of wax)

Instead of a plasticizer to soften PVB resins, a wax, hexadecanol from Henkel was checked also for that function. A batch of about 380 g of 20% B-79, and about 20% hexadecanol and about 227 g of powders and Methocel as described above, plus about 30% water was mixed at about 60° C. for over about 4 minutes. The resulting honeycomb had a fair quality with some tiny pits on the skin. There were a few small PVB chips present under a microscope, suggesting that wax can indeed soften PVB effectively for a fairly uniform mixing result but not as efficiently as a plasticizer such as in Example 5.

EXAMPLE 7

(addition of wax and plasticizer)

A batch of about 436 g with about 20% B-79 (presoaked for about 6 minutes with about 20% P-3 or about 50% P-3 in a PVB/P-3 combination) and about 20% hexadecanol, and about 227 g of powders and Methocel as described above, plus about 35% water was mixed at about 60° C. for over about 5 minutes. A very sticky and soft mass was obtained, which became tough when cooled to room temperature. This batch seemed to offer some fiber forming and heat sealable properties. Under a microscope, the mixed material was very smooth and uniform with no PVB chips visible. The combination of plasticizer (for presoaking PVB) and wax provides the most efficient way of rendering these mixtures homogeneous.

EXAMPLE 8

(addition of wax and plasticizer)

When the plasticizer content was lowered from about 20% as in Example 7, to about 10%, the stickiness in a batch was reduced greatly to yield a normal extrusion result, i.e., no collapsing of cells or slumping of the ware. A batch of about 407 g of about 20% B-79 (presoaked about 5 minutes with about 10% P-3 or about 33.3% P-3 in a PVB/P-3 mixture) and about 20% hexadecanol and about 227 g of the powder and organic binder mixture described previously) and about 32% water was mixed at about 60° C. for about 5.5 minutes. A soft nonsticky and rubbery mass was obtained, which could be stretched to form thin fibers and became tough when cooled to room temperature. Under a microscope, the mixed material was smooth, uniform, without any PVB chips. The resulting honeycomb displayed an excellent quality in skin and cell knitting, and a strong water repellency.

This result reconfirms the fact that a hydrophobic polymer such as PVB can be directly mixed uniformly in an aqueous batch with a cellulose ether organic binder combined with a plasticizer and wax. Moreover, such a combined additive system can modify a tough PVB resin so that it can be processed at temperatures far below its normal flow temperature of about 110° C. The role of a wax compound was to enhance the hydrophobicity of the organic binder macromolecules so as to facilitate their accommodation of any hydrophobic material such as PVB. So any hydrophobic compounds which are compatible with a cellulose ether (not necessarily a plasticizer) can serve the same role as a wax compound did in the above system. Thus, to mix a polymer uniformly in an aqueous mixture having a cellulose ether organic binder, a plasticizer, or a plasticizer plus a plasticizer enhancing compound which is compatible with the organic binder such as a wax, are most ideally suited.

EXAMPLE 9

(addition of plasticizer and wax)

As the plasticizer content is reduced further from about 10% to about 5%, a batch with PVB became harder, tougher and less sticky and stretchable. A batch of about 392 g of about 20% B-79 (presoaked about 4 minutes with about 5% P-3 or about 20% P-3 in a PVB/P-3 combination) and about 20% hexadecanol in about 227 g of powders and organic binder as described above), plus about 30% water was mixed at about 60° C. for over about 4 minutes. Under a microscope, the system still revealed a uniform mixture. The nonsticky batch could not be stretched continuously into thin fiber forms and became tougher and stiffer (to cut with a knife) than a 10% P-3 system (Example 8) when cooled to room temperature. The resulting honeycomb had a very good ware quality. A honeycomb would show a significant rapid setting and water repellent feature when cooled to room temperature (both stronger than Example 8), and could be dried completely in a 100° C. oven with some tiny blisters formed on the skin.

EXAMPLE 10

(addition of plasticizer and wax)

The procedure of Example 9 was followed except that a smaller amount of P-3 was used (lowered from about 5% to about 3.5%, or about 15% P-3 in a PVB/P-3 combination). About 388 g of mixture was made up. A uniform batch could still be obtained. All properties of the batch and the honeycomb were very similar to those of Example 9 with a main distinction of being able to dry completely in a 100° C. oven without the blistering. A dielectric drying time of about 10 minutes could dry a sample completely, but still caused a minor blistering, yet no distortion (no reflow problem). This represented the optimum plasticizer level for a Methocel batch containing about 20% PVB and about 20% hexadecanol.

EXAMPLE 11

(addition of plasticizer and wax)

The procedure of Example 10 was followed except that an even smaller amount of P-3 was used (lowered from about 3.5% to about 2.2% P-3 or about 10% P-3 in a PVB/P-3 combination) with a total batch of about 385 g. A uniform batch was obtained. However, this relatively stiff batch yielded only a fair quality of honeycombs. Drying at about 100° C. did not cause blistering.

In summary, it has been shown that a hydrophobic polymer such as PVB can directly be added to aqueous mixtures containing cellulose ether organic binder as Methocels with the aid of a plasticizer or, for a better result, with a plasticizer to presoak the PVB, and a hydrophobic enhancing additive such as wax. With increasing plasticizer levels, (toward about 50% P-3 in a PVB/P-3 system), the batch will tend to be stickier and softer when hot to show heat-sealing and fiber-forming properties. As the plasticizer content lowers, the batch becomes stiff (less flow) and nonsticky and the resulting honeycomb displays strong rapid-setting, and good drying characteristics (no blistering at about 100° C.) but poorer skin quality. All honeycombs show a tough, strong feature and good water repellency when cooled to room temperature. A plasticizer level of about 15% P-3 in a PVB/P-3 combination with about 20% PVB and about 20% hexadecanol has been found to work especially well.

Varying the wax levels

The following examples were done using a P-3 plasticizer level of about 3.5%, and the wax level as hexadecanol was varied from about 10%–40%.

EXAMPLE 12

A mixture of about 383 g containing about 20% B-79 (presoaked about 4 minutes with about 3.5% P-3 or about 15% in a PVB/P-3 combination) and about 40% hexadecanol, and containing about 206 g powder oxides as in Example 1 and about 3% K 75M Methocel and about 25% water were mixed at about 60° C. for over about 4 minutes. A very uniform, soft, slightly sticky batch was obtained with lower mixing torque and extrusion pressure than those of a 20% wax batch, Example 10). However, the batch could not be stretched continuously into smooth fine fibers. The resulting honeycomb had a very smooth and glossy skin and showed a very strong rapid-setting feature plus good water repellency when cooled to room temperature. However, the honeycomb tended to blister easily when dried at about 100° C.

EXAMPLE 13

The procedure of Example 12 was followed except that about 30% wax and about 220 g of powder oxides was used for a total of about 399 g. All properties were very similar to Example 12 (40% wax) with only slightly higher torque and pressure and a slightly stiffer batch in this example.

EXAMPLE 14

The procedure of Example 12 was followed except that about 15% wax, and 220 g of oxide powders, and about 30% water were used for a total of about 377 g of batch material. As the wax content was reduced to below about 20%, the batch became nonsticky, slightly tough, and difficult to stretch with increasingly higher mixing torque and extrusion pressure. The skin quality of the honeycomb deteriorated also. However, no blistering took place during drying at about 100° C. or dielectrically.

EXAMPLE 15

The procedure of Example 12 was followed except that about 10% wax, and about 240 g of oxide powders were used for a total of about 388 g of batch material. All properties were very similar to Example 14 (15% wax) with even stiffer characteristics. The skin quality was worse than that of Example 14. However, under microscope, the batch was still very uniform without any PVB chips.

EXAMPLE 16

The procedure of Example 12 was followed except that about 20% wax, about 220 g of oxide powders were used for a total of about 377 g of batch material. This was also similar to Example 10 with only a lower water content—25% as compared to 30% in Example 10. The batch was uniform like in Example 10, but slightly stiffer. The resulting honeycomb also yielded a perfect skin. However, unlike Example 10, it blistered at 100° C.

In summary, increasing the wax content (to 40%) enhances batch rheology greatly as wax contributes more as a co-binder in an aqueous cellulose ether batch, thus lowering mixing torque and extrusion pressure plus improving skin quality. A PVB/oxide powder batch with high wax contents tends to be softer, stickier, and the resulting honeycomb will have a strong rapid-setting but also will blister more easily during drying. As the wax content is lowered, a PVB/oxide powder batch becomes stiffer, nonsticky with a poorer rheology for a worsening skin quality but there is no blistering during drying. For best rheology and drying, the wax content is preferably about 20% for the above-described oxide powder batches, with about 20% B-79 and about 3.5% P-3 (for a 15% P-3 in a PVB/P-3 combination), Example 10.

Varying the PVB content

Once the plasticizer and wax contents were optimized, the PVB level was studied from 10–20% with about 15% P-3 and about 20% hexadecanol. The 20% PVB is discussed in Example 16.

EXAMPLE 17

A batch of about 381 g of about 15% B-79 (presoaked with about 2.63% P-3 or about 15% in a PVB/P-3 combination) and about 20% hexadecanol and about 237 g of oxide powders and about 3% K 75M Methocel and about 25% water were mixed at about 60° C. for over about 4 minutes. The batch was uniform under the microscope, not sticky and stiffer than the batch of Example 16, but difficult to stretch into fine fibers. The resulting honeycomb yielded a newly perfect skin (slightly worse than Example 16) and showed a very significant rapid-setting effect and no blistering in drying at about 100° C. (better than Example 6).

EXAMPLE 18

The procedure of Example 17 was followed except that a honeycomb of about 47 cells/cm² (about 300 cells/in²)/0.26 mm (10.5 mil) wall/0.28 mm (11 mil) skin was made. The ware quality, stiffening effect and drying at about 100° C. were all the same as those in Example 17.

EXAMPLE 19

The procedure of Example 17 was followed except that 10% B-79 (presoaked with about 1.75% P-3 or about 15% P-3 in a PVB/P-3 combination) and about 247 g of oxide powders with a total of about 383 g of batch material were used. The batch was uniform, slightly stiffer than in Example 16, and unable to be stretched into fine fibers. The ware quality was not as good as Example 16, but showed the same good stiffening effect and drying without blistering at about 100° C.

In summary, decreasing the PVB content from about 20% to 10% makes a batch stiffer, less sticky, and stretchable. The uniform batch can still yielded honeycombs (both 31 and 47 cells/cm² (200 and 300 cpsi) with good skin quality and rapid-setting feature plus drying without blistering at about 100° C. The best composition for no blistering and good skin quality is about 15% B-79 and about 2.63% P-3 (for a 15% P-3 in a PVB/P-3 combination) plus about 20% hexadecanol with oxide powders, Example 17.

Effects of sintering

The products of Examples 9 and 16 were fired successfully with no reflow or cracking under sintering conditions of about 1400° C. for about 10 hours in air. However, the products of Examples 17 and 18 yielded a fine crack at bottom where sand was used to hold samples. The use of fired honeycombs as holders should minimize such cracks at the bottom due to the fact that a more uniform thermal environment can be achieved around samples during firing.

Various shapes

Besides honeycombs, a PVB-containing aqueous Methocel batch can be extruded into ribbons (or tapes) which can then be stretched into films, or spaghetti's, then stretched into fine fibers (like a melt spinning of fibers). A honeycomb can also be redrawn into one of higher cell density. The fiber and high cell density honeycombs will be discussed in more detail below.

Spinning ceramic fibers

EXAMPLE 20

A batch of about 398 g of about 20% B-79 (presoaked with about 20% P-3 or about 50% of P-3 in a PVB/P-3), and about 227 g of oxide powders and about 3% K 75M plus about 38% water was mixed at about 60° C. /+6 minutes. The batch was nearly uniform with a few small PVB chips visible under the microscope, and soft, and slightly sticky when hot. The warm spaghetti (about 0.31 cm or ⅛" diameter) extruded at about 60° C. showed only a fair fiber forming capability at about room temperature.

EXAMPLE 21

The procedure of Example 20 was followed except that the batch contained about 5% hexadecanol for a total of about 409 g. The almost uniform batch (few tiny PVB chips) was stickier and more rubbery (stretchable) than that of Example 21 without wax. The warm spaghetti could be stretched continuously at about room temperature to form long, smooth fine fibers, which became tough, strong, and flexible when cooled completely to about room temperature.

EXAMPLE 22

The procedure of Example 20 was followed except that about 10% hexadecanol was used for a total of about 420 g of batch material. The soft, sticky batch was uniform (no PVB chips) under the microscope. Thus a minimum of about 10% wax was needed in about a 20% PVB (presoaked with about 50% P-3 in a PVB/P-3) batch to obtain a uniform system at about 60° C. The warm spaghetti displayed an excellent fiber forming tendency in yielding continuously > about 30.5 cm (> about 1 ft) long fine fibers when stretched at about room temperature. Fibers could be dried completely at about 100° C. without blistering to yield a diameter of about 50 micrometers and remain strong and flexible.

EXAMPLE 23

The procedure of Example 20 was followed except that about 15% hexadecanol was used and the amount of powder oxides was about 216 g (vs about 227 g for Example 20) for a total of about 412 g of batch material. The uniform batch was very sticky and soft. Though its warm spaghetti could still show a good fiber forming trend, the fibers obtained seemed to be weaker than those in Example 22. Thus the best wax level in a powder oxide mixture containing about 20% PVB/20% P-3 seemed to be about 10% for yielding the best mixing and fiber forming capability (Example 22), even though the range of about 5–15% wax could all yield fibers. Fibers obtained in this example also could be dried at about 100° C. without blistering.

EXAMPLE 24

The fiber forming trend of a lower PVB system (about 15% vs about 20% in all earlier ones) was observed in this example. A batch of about 398 g containing about 15% B-79 (presoaked with about 15% P-3 or about 50% P-3 in a PVB/P-3 combination) and a powder oxide mixture of about 227 g (which includes about 3% K 75M), about 10% hexadecanol, and about 38% water was mixed at about 60° C. /+6 minutes. The uniform batch was less sticky but tougher than Example 22 (about 10% wax and about 20% PVB). It also yielded smooth fibers when stretched at about room temperature like Example 23. All fibers could be dried at about 100° C. without blistering.

EXAMPLE 25

The procedure of Example 24 was followed except that about 20% wax was used for a batch total of about 420 g. The uniform batch showed a slightly worse fiber forming trend than that of Example 24.

In summary, as aqueous Methocel/oxide powder batch containing about 20% PVB/20% P-3 (or a 50% P-3 in a PVB/P-3 combination) and about 5–15% hexadecanol (with about 10%, Example 22 being the best) showed excellent fiber forming when stretched at about room temperature to yield thin fibers of about 50 micrometers in diameter. This fiber forming capability of a batch suffers somewhat as a PVB/P-3 level drops from about 20%/20% (total about 40%) to about 15%/15% (total of about 30%). Also, a system of about 20% PVB and lower (10%) P-3 (or about 33.3% PVB in a PVB/P-3 combination) with about 20% wax (Example 8) can form fibers. However, a system of about 20% PVB with too low (about 5%) P-3 (or about 20% P-3 in a PVB/P-3 combination) would not form fibers (Example 9). Certainly, the use of higher molecular weight PVB resin, such as B-72, 73, or 74 should enhance the fiber forming capability of an aqueous Methocel batch.

Redrawing high cell density honeycombs

EXAMPLE 26

A batch of about 395 g containing about 20% B-79 (presoaked with about 13.3% of P-3 or about 40% P-3 in a PVB/P-3 combination) and about 20% hexadecanol in a powder oxide batch of about 216 g and about 3% K 75 M plus about 32% water was mixed at about 60° C. /+9 minutes. The batch was uniform under the microscope and could be extruded into a 15 cells/cm² (200 cells/in²)/0.4 mm (16 mil) wall (web) honeycomb of about 2.54 cm (1") in diameter with excellent ware quality. With one end of a section of honeycomb still attached to the die exit, the other end could be stretched downward with hand to form a smooth, elongated honeycomb with a narrower diameter about 2.2 cm (⅞"). The cross section of the new honeycomb showed a denser cell pattern than the original 15 cell/cm² (200 cell in²) honeycomb. Therefore a soft yet tough honeycomb could be redrawn at elevated temperature.

EXAMPLE 27

About 396 g of batch material containing about 15% B-79 (presoaked with about 10% P-3 or about 40% P-3 in a PVB/P-3 combination, about 20% hexadecanol with about 227 g of powder oxides, and about 3% K 75M plus about 32% water was mixed at about 60° C. /+7 minutes. The uniform batch was extruded at about 60° C. into a 47 cells/cm² (about 300 cells/in²)/0.26 mm (10.5 mil) wall/0.28 mm (11 mil) skin honeycomb of about 2.54 cm (about 1") in diameter with a perfect ware quality. However, the relatively thin skin would quickly initiate cracking when stretching the soft ware at about 60° C. So, honeycombs with thicker skins were tried in the following examples.

EXAMPLE 28

The procedure of Example 27 was followed except that a honeycomb of 47 cells/cm² (about 300 cells/in²)/0.26 (10.5 mil) wall/0.52 mm (21 mil) skin honeycomb of about 2.54 cm (about 1") in diameter was made. With a thicker skin, the stretching of a honeycomb section (with one end attaching to the die exit) could be initiated smoothly, but was always terminated by the breaking off of the honeycomb near the upper end, close to the die exit. This suggested that the ware was too soft and weak due to too high a batch temperature (about 60° C. ). So, stretching was carried out at lower temperatures.

EXAMPLE 29

The procedure of Example 28 was followed except that the honeycomb was extruded at a lower temperature (about 45° C. ). Still, the ware quality was excellent. For the first time, a smooth, unbroken, narrower (about 1.3 cm (½" diameter)) honeycomb could be obtained by stretching downward a section of the original 2.54 cm (1") honeycomb (with one end still attaching to a die exit). This confirmed the importance of having a thicker skin for a better flow and a lower temperature for a stronger body during stretching. The redrawn honeycomb could be dried at about 100° C. overnight and displayed a high cell density of about 188 cells/cm² (about 1200 cells/in²) from the original one of 47 cells/cm² (about 300 cells/in²). The dried high cell density honeycomb was successfully sintered.

EXAMPLE 30

The procedure of Example 28 was followed except that the honeycomb was extruded with a skin of about 0.4 mm (about 16 mils) at a very low temperature of about 35° C. The ware quality was excellent. A section of honeycomb about 47 cells/cm² (about 300 cells/in²) could be redrawn downward to yield a straight (about 7.6 cm (3") long, smooth, concentric, narrower (about 1.6 cm (⅝")) diameter honeycomb with a higher cell density (about 120 cells/cm² (768 cells/in²)). This reconfirmed the importance of redrawing a honeycomb at a lower temperature for obtaining a better quality in the high cell density product.

In summary, an aqueous oxide powder batch containing a plasticizing organic binder and 15–20% PVB/10–13.3% P-3 (or a 40% P-3 in a PVB/P-3) and about 20% hexadecanol displayed a redrawing capability to yield about 2–3 times high cell density products. The importance of a thicker skin and lower redrawing temperature for obtaining a good high cell density product was demonstrated.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A plastically deformable aqueous mixture capable of being shaped into a body, the mixture comprising powders selected from the group consisting of ceramic, glass-ceramic, glass, molecular sieve, carbon, metal, and combinations thereof, cellulose ether organic binder, water insoluble hydrophobic polymer co-binder having an average molecular weight of at least about 8,000, plasticizer, and water.

2. A mixture of claim 1 wherein the powders are selected from the group consisting of ceramic, glass ceramic, glass, and molecular sieve.

3. A mixture of claim 1 wherein the organic binder comprises components selected from the group consisting of methylcellulose, methylcellulose derivatives, and combinations thereof.

4. A mixture of claim 1 wherein the polymer is selected from the group consisting of polyvinyl butyral, ionomers, polyurethane, polyester, polyamide, acrylics, copolyethylene/acrylic acid, thermoplastic elastomers, and combinations thereof.

5. A mixture of claim 1 wherein the mixture contains wax.

6. A mixture of claim 5 wherein the wax is selected from the group consisting of paraffin wax, microcrystalline wax, mineral wax, vegetable waxes, animal waxes, fatty alcohols, fatty acids, fatty acid esters, polyethylene wax, polyethylene glycol, hydrogenated oils, ketones, amines, amides, chlorinated waxes, synthetic hydrocarbon waxes, metallic soaps, and mixtures thereof.

7. A mixture of claim 6 wherein the wax is selected from the group consisting of hexadecanol, octadecanol, paraffin wax, microcrystalline wax, polyethylene wax, stearic acid, palmitic acid, myristic acid, propylene glycol monostearates, ethylene glycol monostearates, and mixtures thereof.

8. A mixture of claim 4 wherein the polymer is selected from the group consisting of polyvinyl butyral, polyurethane, polyester, thermoplastic elastomers, ionomers, and combinations thereof.

9. A mixture of claim 8 wherein the plasticizer is selected from the group consisting of butyl ricinoleate, polyester having an average molecular weight of less than about 8,000, and linseed oil.

10. A mixture of claim 9 wherein the polymer is polyvinyl butyral and the plasticizer is butyl ricinoleate.

11. A mixture of claim 10 wherein the mixture contains hexadecanol.

12. A mixture of claim 11 wherein the mixture comprises powders selected from the group consisting of cordierite, mullite, and combinations thereof, and in weight percent based on the powders about 2% to 10% organic binder selected from the group consisting of methylcellulose, methylcellulose derivatives, and combinations thereof, about 5% to 50% polyvinyl butyral, about 2% to 50% butyl ricinoleate, and about 5% to 60% hexadecanol wax.

13. A mixture of claim 12 wherein the mixture comprises powders selected from the group consisting of cordierite, mullite, and combinations thereof, and in weight percent based on the powders about 3% to 6% organic binder selected from the group consisting of methylcellulose, methylcellulose derivatives, and combinations thereof, about 5% to 20% polyvinyl butyral, about 3% to 20% butyl ricinoleate, and about 5% to 40% hexadecanol wax.

14. A method of making a body, the method comprising, a) mixing components which comprise powders selected from the group consisting of ceramic, glass-ceramic, glass, molecular sieve, carbon, metal, and combinations thereof, cellulose ether organic binder, water insoluble hydrophobic polymer co-binder having an average molecular weight of at least about 8,000, plasticizer, and water in a high shear mixer at a temperature of about 30° C. to 70° C. to form a homogeneous mixture thereof;

b) extruding the mixture at a temperature of about 30° C. to 70° C. into a green body;

c) drying the green body; and d) firing the green body to produce the body.

15. A method of claim 14 wherein the components are mixed by directly combining all the components simultaneously in a high shear mixer.

16. A method of claim 14 wherein the powders are selected from the group consisting of ceramic, glass ceramic, glass, and molecular sieve.

17. A method of claim 14 wherein the organic binder comprises components selected from the group consisting of methylcellulose, methylcellulose derivatives, and combinations thereof.

18. A method of claim 14 wherein the polymer is selected from the group consisting of polyvinyl butyral, ionomers, polyurethane, polyester, polyamide, acrylics, copolyethylene/acrylic acid, thermoplastic elastomers, and combinations thereof.

19. A method of claim 14 wherein wax is a component in the mixture.

20. A method of claim 19 wherein the wax is selected from the group consisting of paraffin wax, microcrystalline wax, mineral wax, vegetable waxes, animal waxes, fatty alcohols, fatty acids, fatty acid esters, polyethylene wax, polyethylene glycol, hydrogenated oils, ketones, amines, amides, chlorinated waxes, synthetic hydrocarbon waxes, metallic soaps, and mixtures thereof.

21. A method of claim 20 wherein the wax is selected from the group consisting of hexadecanol, octadecanol, paraffin wax, microcrystalline wax, polyethylene wax, stearic acid, palmitic acid, myristic acid, propylene glycol monostearates, ethylene glycol monostearates, and mixtures thereof.

22. A method of claim 18 wherein the polymer is selected from the group consisting of polyvinyl butyral, polyurethane, polyester, thermoplastic elastomers, ionomers, and combinations thereof.

23. A method of claim 22 wherein the plasticizer is selected from the group consisting of butyl ricinoleate, polyester having an average molecular weight of less than about 8,000, and linseed oil.

24. A method of claim 23 wherein the polymer is polyvinyl butyral and the plasticizer is butyl ricinoleate.

25. A method of claim 24 wherein hexadecanol is a component in the mixture.

26. A method of claim 25 wherein the mixture comprises powders selected from the group consisting of cordierite, mullite, and combinations thereof, and in weight percent based on the powders about 2% to 10% organic binder selected from the group consisting of methylcellulose, methylcellulose derivatives, and combinations thereof, about 5% to 50% polyvinyl butyral, about 2% to 50% butyl ricinoleate, and about 5% to 60% hexadecanol wax.

27. A method of claim 26 wherein the mixture comprises powders selected from the group consisting of cordierite, mullite, and combinations thereof, and in weight percent based on the powders about 3% to 6% organic binder selected from the group consisting of methylcellulose, methylcellulose derivatives, and combinations thereof, about 5% to 20% polyvinyl butyral, about 3% to 20% butyl ricinoleate, and about 5% to 40% hexadecanol wax.

28. A method of claim 25 wherein the mixture is extruded into a multicellular green body which is thereafter drawn into a multicellular body having a higher cell density than the multicellular body before drawing.

29. A method of claim 28 wherein the mixture comprises powders selected from the group consisting of cordierite, mullite, and combinations thereof, and in weight percent based on the powders about 3% to 6% organic binder selected from the group consisting of methylcellulose, methylcellulose derivatives, and combinations thereof, about 15% to 20% polyvinyl butyral, about 10% to 13% butyl ricinoleate, and about 10% to 20% hexadecanol wax.

30. A method of claim 25 wherein the mixture is extruded into noodles which are then drawn into fibers.

31. A method of claim 30 wherein the mixture comprises powders selected from the group consisting of cordierite, mullite, and combinations thereof, and in weight percent based on the powders about 3% to 6% organic binder selected from the group consisting of methylcellulose, methylcellulose derivatives, and combinations thereof, about 15% to 20% polyvinyl butyral, about 15% to 20% butyl ricinoleate, and about 5% to 15% hexadecanol wax.

* * * * *